Figure 1:
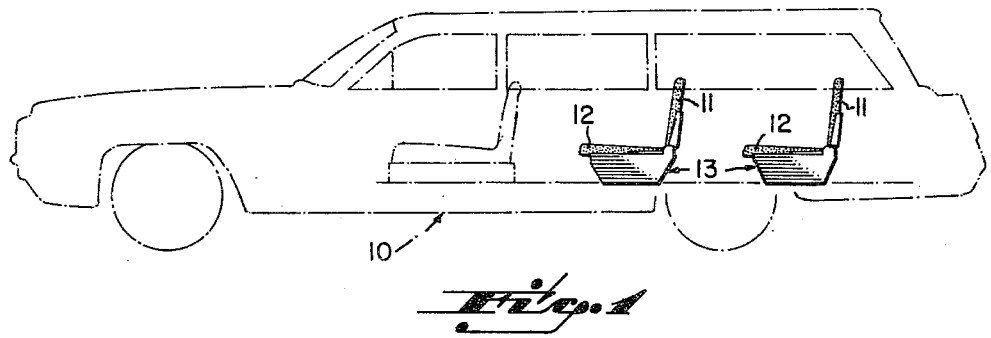

July 6, 1965

M. G. STOCK 3,193,324

ADJUSTABLE SEAT

Filed Nov. 14, 1963

5 Sheets-Sheet 1

INVENTOR.
MARVIN G. STOCK
BY
Wood, Herron and Evans
ATTORNEYS

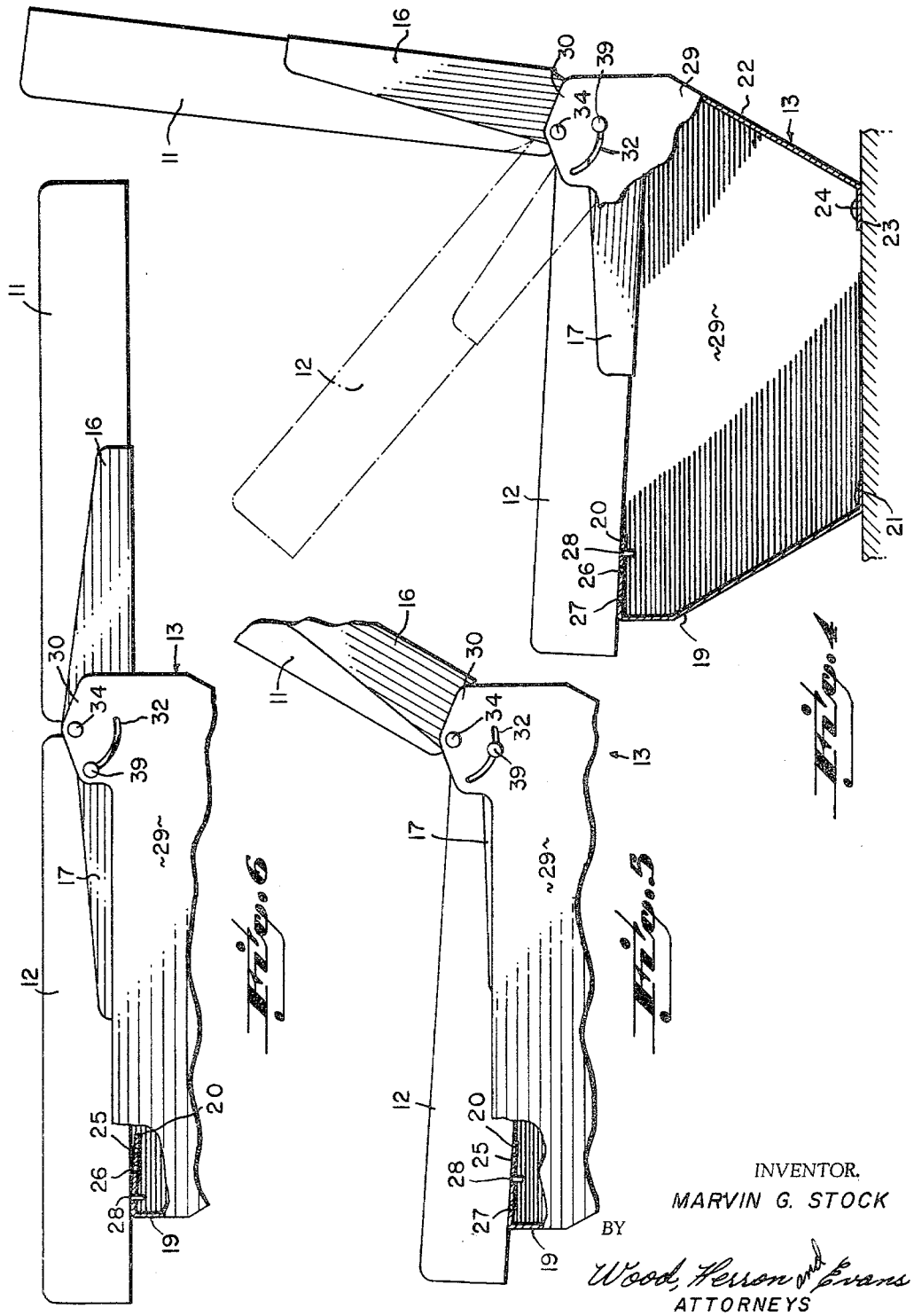

July 6, 1965 M. G. STOCK 3,193,324
ADJUSTABLE SEAT
Filed Nov. 14, 1963 5 Sheets-Sheet 3

INVENTOR.
MARVIN G. STOCK
BY
Wood, Herron & Evans
ATTORNEYS

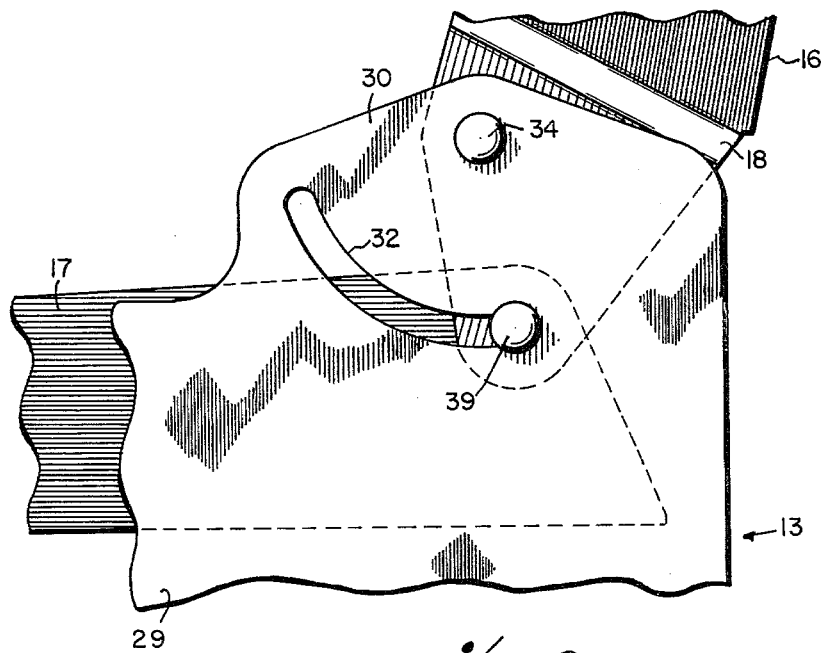
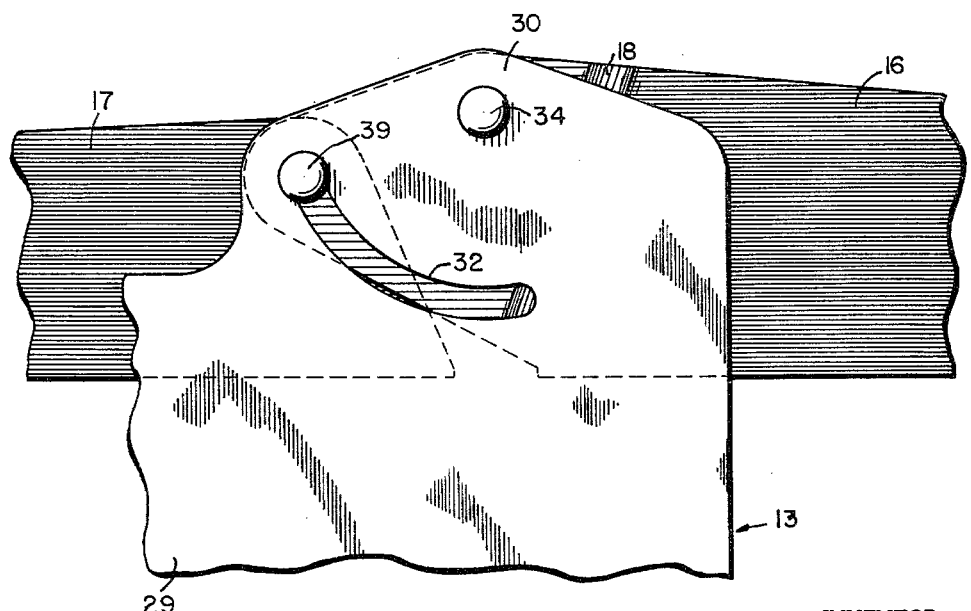

July 6, 1965 M. G. STOCK 3,193,324
ADJUSTABLE SEAT

Filed Nov. 14, 1963 5 Sheets-Sheet 5

INVENTOR.
MARVIN G. STOCK
BY
*Wood, Herron & Evans*
ATTORNEYS

United States Patent Office 3,193,324
Patented July 6, 1965

3,193,324
ADJUSTABLE SEAT
Marvin G. Stock, 1783 Churchwood Drive,
Cincinnati, Ohio
Filed Nov. 14, 1963, Ser. No. 323,748
6 Claims. (Cl. 297—64)

This invention relates to an improved seat for an automobile, ambulance, boat or the like, that can be quickly adjusted to provide a bed, uninterrupted load area, or more comfortable seating positions.

Today with more and more people able to afford automobiles and with the vast networks of super highways linking the continent, automobile travel has reached an all time high. Because of the great amount of time spent in automobile travel it is extremely desirable to equip automobiles with seats which can be individually adjusted to each occupant's physical needs or tastes and, to provide an automobile with a comfortable sleeping area which can be utilized while traveling.

A growth of boating has accompanied that of automobile touring and today there are more boat owners than ever before. Most people purchase boats for enjoyment and relaxation and use their boats for fishing, water-skiing, swimming, sunbathing, or for "weekend sailing." To insure that these various activities are enjoyable and relaxing, the design of the boat's seating accommodations should provide maximum comfort and versatility. If an occupant wants to fish or ride, his comfort is greatly enhanced by reclining seats. Similarly, to enable an occupant to sunbathe or to sleep, provision should be made for an adjustable seat which will fully recline.

In trying to satisfy these requirements various types of adjustable seats have been devised and some are in use. However, these seats have not successfully fulfilled these demands since many are too complicated, requiring considerable time and effort to adjust. Others have been too expensive, and still others are dominated by unattractive hardware.

An objective of the present invention has been to provide a seat for use in boats, automobiles and the like, which combines among others the following desirable features: (1) ease of operation in adjusting the angular relationship of the seat panel and the back panel; (2) freedom from unsightly hardware; (3) adjustability between upright and reclining positions with provision for intermediate positions of the back panel; (4) provision for the seat panel to be comfortably inclined when the back panel is in an upright position and to be disposed in a horizontal plane for the lowered or bed position of the back panel; and (5) inexpensive to manufacture.

No prior seat has combined all of these desirable features. While it is difficult to characterize prior seats as having a particular disadvantage, it can be said that where the prior art seats have attempted to provide one of the advantages listed above, it has been at the sacrifice of some other advantage. For example, to provide adjustability to plural positions, it has been common practice to require unsightly hardware utilizing machined parts which are expensive to manufacture. On the other hand, where simple and economical structures have been provided, there has been a sacrifice of the advantages of adjustability and seat panel positions referred to above.

The objectives and advantages of the present invention are achieved through a unique cooperation of three elements of hardware normally found in seats; namely, the base upon which the seat is mounted, a frame member for the seat panel, and a frame member for the back panel. More specifically, the back panel is pivoted to the base, the seat panel is pivoted to the back panel and cooperating means on the seat panel and base respectively are provided for selectively fixing the seat panel in one of a plurality of longitudinal positions with respect to the base. All of the advantages enumerated above are derived from this combination of minimum elements and their simplified interconnection.

As to ease of operation, all that is required to change the position of the seat is the lifting of the seat panel from its locking engagement with the base, shifting the back panel to its desired position, and returning the seat panel to a newly selected locked position. The cooperating means to effect the lock of the seat panel may be nothing more than a projecting pin in one of the elements and a plurality of longitudinally spaced holes to receive the pin in the other element. To provide for plural positions requires only the provision of longitudinally spaced holes in the pin receiving element. The economy of the seat hardware should be obvious for it requires, except for the pins and rivets, only sheet metal stampings which require no machining. Provision for adjustment of the seat panel from an inclined position to a horizontal position requires only a proper orientation of the two pivot points referred to above.

Further, and as an advantage not referred to above, by providing an arcuate slot to receive the pivot pin, which joins the seat panel to the back panel, a two point support is provided for the back panel in its fully reclined position. The two point support is constituted by the engagement of the pivot pin with the end of the arcuate slot and by the lock between the seat panel and the base. This two point support has proved to be extremely rugged and does not require additional bracing to support the seat panel in its cantilevered, fully reclined position.

It has been still another objective of the invention to provide a seat of the type described above which can be used in conjunction with identical seats in an automobile, boat or the like, to provide a plurality of seating and sleeping accommodations, the change from one accommodation to the other accommodation requiring only a few seconds.

Figure 2:
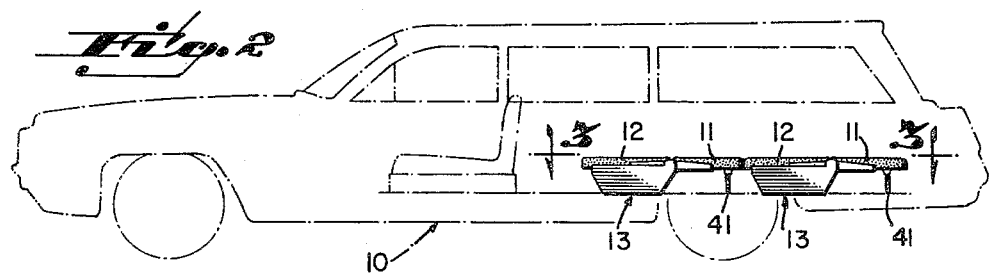
Figure 3:
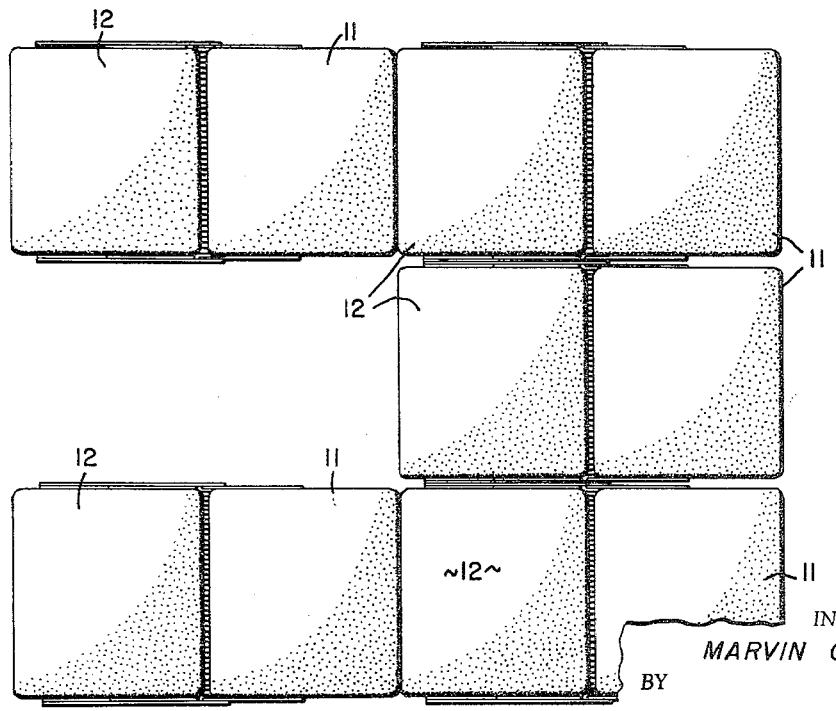
Figure 7:
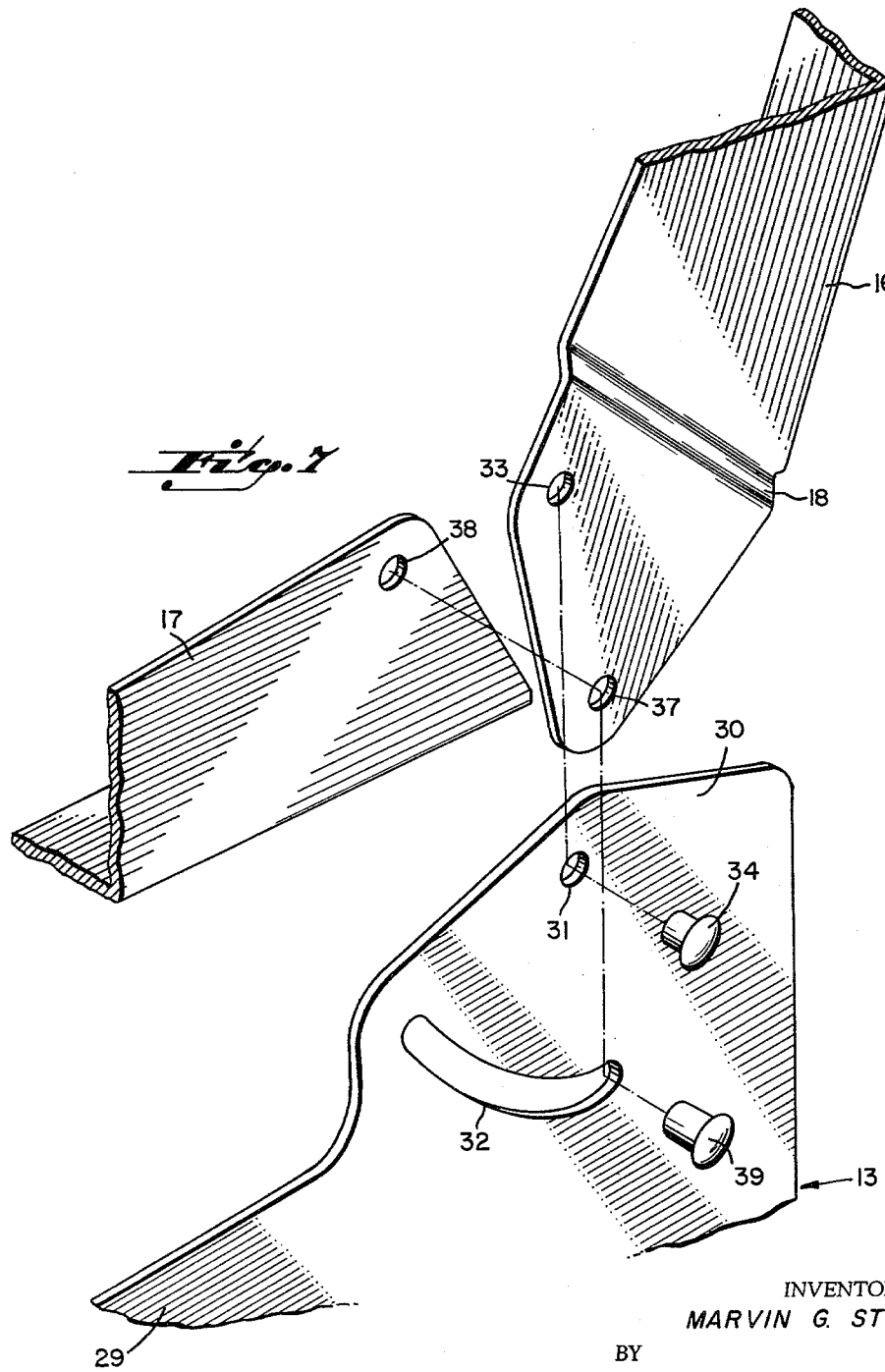
Figure 10:
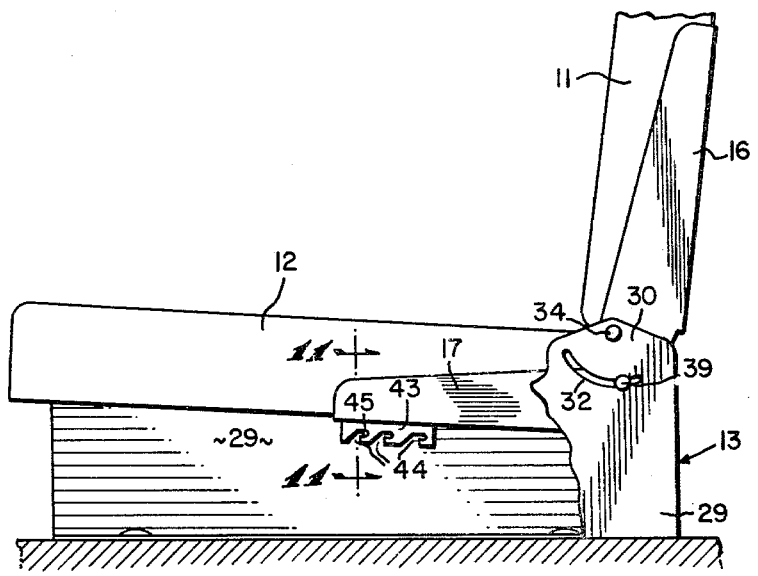
Figure 11:
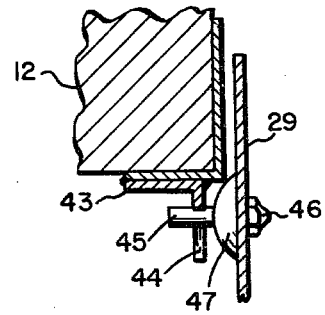

These and other objectives of the invention will become more readily aparent from the following detailed description taken in conjunction with the accompanying drawings in which:

FIG. 1 is a side elevational view showing an automobile in which the seats of the present invention are incorporated, FIG. 2 is a side elevational view showing the seats fully reclined, in an automobile, FIG. 3 is a top plan view along lines 3—3 of FIG. 2 showing five of the seats in the fully reclined position, FIG. 4 is a side elevational view partially broken away, of the seat showing the manner in which the seat panel may be raised to provide access to a storage area in the base, FIG. 5 is a fragmentary side elevational view of the seat showing the back panel in a partially reclined position, FIG. 6 is a fragmentary side elevational view of the seat showing the back panel in a fully reclined position, FIG. 7 is a disassembled perspective view of part of the seat showing the way the seat and back panels are pivoted to each other and to the base, FIG. 8 is a side view of part of the seat showing the back and seat panels pivoted to the base with the back panel in an upright position, FIG. 9 is a side view of part of the seat showing the seat and back panels pivoted to the base with the back panel in the fully reclined position, FIG. 10 is a side elevational view showing an alternate means for selectivity locating the longitudinal position of the back panel, and FIG. 11 is a cross sectional view taken along the lines 11—11 of FIG. 10 showing a locking pin for selectively locating the longitudinal position of the back panel.

With reference to the drawings, the adjustable seat comprises a seat panel 12 and a back panel 11, both of which may be cushioned for greater comfort, and which are pivotally fastened to each other and to a base 13 which is secured by any suitable means to the floor of the automobile 10. It should be noted here that while the invention has been described with particular reference to seats mounted in a station wagon, the seats have application to other modes of transportation including automobile sedans, boats and the like. It might also be noted here that the seats are self contained units which require no structural interrelation with adjoining seats and which can be disposed in the transporting structure in a variety of patterns depending upon the individual desires. One such pattern is illustrated in FIG. 3, wherein five seats are mounted in the station wagon in a U-shaped configuration to permit storage within the confines of the U and to permit access to the rear seats while at the same time permitting a substantial amount of seat and/or bed space.

The change of the seat from an upright to a reclined position as shown in FIGS. 1 and 2 respectively is an extremely simple operation. All that is required is the lifting of the seat panel 12 a fraction of an inch and thereafter pivoting the back panel 11 to the desired angular position including the fully reclined position of FIG. 2. One or more seats may be brought to the reclined position depending upon the desires of the occupants. In the embodiment illustrated, many combinations are possible. For example, the two front seats can be maintained in an upright position while the three rear seats can be fully reclined thereby providing seating space for two and bed space for two more. Other combinations will be apparent.

The seat structure is not only simple and economical but also is extremely rugged, capable of withstanding the rigors of hard usage without becoming damaged or becoming a source of annoying rattles. The structure is described in more detail in FIGS. 4–9.

More specifically, fastened to the seat panel 12 one on each side, are frame members or brackets 17 which are L-shaped in cross section. Similarly, fastened to the back panel 11, one on each side, are frame members or brackets 16 which are L-shaped in cross section, and optionally stepped at 18.

The base 13 is a hollow sheet metal member which is generally trapezoidal in vertical section. The base has a front wall 19 having an upper inwardly projecting flange 20 and a lower inwardly projecting flange 21. The base has a rear wall 22 having an inwardly projecting lower flange 23. The lower flanges 21 and 23 are formed with holes (not shown) by which the seat may be mounted, through the use of rivets or bolts 24 to the floor or deck of the transporting structure.

The upper flange 20 is provided with longitudinally spaced holes 25, 26 and 27 which are adapted to receive a pin 28 which is fixed to the seat panel and extends downwardly from it. The holes 25–27 may be formed on each side of the base 13 and similarly the seat panel 12 may be provided with two pins, one on each side, to cooperate with the respective groups of holes. The co-operation of the pins 28 with the holes 25–27 provide means for fixing the back panel 11 in one of a plurality of angular positions with respect to the base and selectively locating the longitudinal position of the seat panel 12.

The base has two side walls 29 each of which has an upwardly projecting post 30 at its rearward edge to which the seat panel and the back panel are mounted as will be described. It should be noted that this is the preferred embodiment of my invention and that it would be possible to eliminate the projecting posts 30 by employing side walls 29 that are the same height as the present projecting posts 30. It would also be possible to employ only two side walls 29 as the base.

Each projecting post 30 has a pivot hole 31 and an arcuate slot 32 located below the hole. For reasons which will become more readily apparent from the description below, in the preferred embodiment of my invention the arcuate slot 32 has its rearward end in a lower position, the slot curving upwardly toward the front of the seat. This relationship, in combination with the remaining seat structure to be described, provides the proper angular relationship of the seat panel with respect to the back panel when it is in an upright or reclined position. The orientation of the arcuate slot 32 just referred to with the hole 31 above has been found to be the best operational orientation.

The back panel bracket 16 has an upper pivot hole 33 and it is pivotally attached to the post 30 by means of a rivet 34 passing through the pivot hole 31 in the post and the hole 33 in the back panel bracket 16.

The back panel bracket 16 has a lower pivot hole 37 which cooperates with a hole 38 in the seat panel bracket 17 to receive a rivet 39 by which the seat and back panels are pivoted together. The rivet 39 passes through the arcuate slot 32 to confine the path of movement of the pivot joint formed by the rivet 39 to the extremities of the arcuate slot 32. The confinement of the pivot joint formed by the rivet 39 is the primary function of the arcuate slot 32. Although the arcuate slot 32 could be omitted by pivoting the seat panel 12 directly to the back panel 11 the resultant structure would not be so rugged particularly when the back panel is in its fully reclined position.

To operate the invention, when the back panel 11 is in the upright position as is shown in FIG. 4, the seat panel 12 is vertically raised from the base 13 which may be easily done since it is pivoted to the base by means of rivets 39 and, the locking pins 28 are easily raised from the holes 25. Next, the back panel 11 is pushed backward to the desired position, whether it be partially or fully reclined. The back panel 11 can easily be reclined since it is pivoted to the side walls 29 or projecting posts 30 by means of rivets 34. When the back panel 11 is reclined the rivets 39 move forward and upward in the arcuate slots 32. The connection of rivets 39 to the seat panel causes the seat panel 12 to move forward assuming a more nearly horizontal position when the back panel 11 is lowered. When a reclining position has been located where the locking pins 28 can be inserted into holes 26 or 27 forward of the holes 25 the seat panel 12 is lowered, locking the seat.

The terminal locations of the arcuate slots 32 are important. The rivet 39 should be in engagement with the rearward end of the slot when pin 28 is in hole 25. This will facilitate the operation of raising the back panel and fixing it in its raised position. More important however is the location of the other end of the slot. It should be positioned so that when the rivets 39 reach the end of their forward travel in the arcuate slots 32 the back panel 11 is in the same horizontal plane as the seat panel 12. When the back panel 11 is horizontal and the locking pins 28 are engaged the back panel 11 has a two point support, namely, the engagement of the pin 28 with hole 27 and rivet 39 with the end of the slot 32. However, if the back panel 11 is reclined to provide cargo hauling area and the cargo is extremely heavy, it may be necessary to provide a brace 41, that can be positioned against the back panel 11 when not in use, to prevent the back panel 11 from being forced any farther towards the floor thereby damaging the seat. Such a brace may be a U-shaped tubular brace and serve as a hand hold for the occupant riding behind the seat it is attached to.

To raise the back panel to the upright position or to a position of less inclination the reverse of the above procedure is performed. That is, the seat panel 12 is raised thereby disengaging the locking pins 28 from the holes 26 or 27. The back panel 11 is then easily raised to the desired position. Raising the back panel 11 causes the seat panel 12 to move backwards and slightly downward because it is pivoted to the back panel 11 by rivets 39 which extend through the arcuate slots 32 that are below the pivot points of the back panel at rivets 34. When the back panel 11 has been raised to the desired position, the seat panel is lowered and the locking pins 28 engage the holes 25 or 26.

An alternative seat panel lock is shown in FIG. 10 for selectively locating the longitudinal position of the seat panel. This alternate lock is especially adaptable in a vehicle such as a boat and it prevents the seat panel from being jarred upwardly, disengaging itself from the base. This alternate lock comprises an L-shaped bracket 43 secured by any suitable means such as rivets (not shown) to the seat panel bracket 17 with one flange extending downwardly in close proximity to the side wall 29. Cut into the L-shaped bracket 43 in the downwardly extending flange are bayonet type slots 44. A pin 45 extends through the side walls 29 and engages the bayonet type slots 44 to provide an efficient locking means. The pin 45 is secured to the side wall 29 by means of an acorn nut 46. Surrounding the pin 45 on the inside of the side wall 29 is an angular metal collar 47 which facilitates the engagement of the pin 45 with the bayonet type slots 44.

If the pin 45 and invert L-shaped slot 44 locking means are employed instead of the pin 28 holes 25–27, the seat panel 12 may be freed by pushing the back panel 11 forward through a slight angle to position the pin 45 in the vertical section of the bayonet type slot 44 and then raising the seat panel 12. The mechanics of adjusting the seat otherwise remains the same.

By pivotally fastening the back panel 11 with the seat panel 12 with the pivoting means passing through the arcuate slots 32, the seat panel's 12 horizontal position relative to the base 13 is varied depending on the back panel's 11 vertical position relative to the base 13. When the back panel 11 is vertical, the seat panel slopes slightly toward the back of the base 13. As the back panel 11 is being lowered the seat panel 12 assumes a more horizontal position until it becomes horizontal when the back panel 11 is horizontal.

Having described my invention I claim:
1. An adjustable seat comprising,
two side walls having arcuate slots extending upwardly and forwardly from the rear of said side walls,
a back panel pivoted to said side walls above said arcuate slots,
a seat panel, and
means pivoting said seat panel to said back panel with said pivoting means extending through the arcuate slots.
2. An adjustable seat comprising,
two side walls,
a back panel pivoted to said side walls,
longitudinally extending brackets fastened to said seat panel and having a downwardly directed flange, said flange having bayonet type slots formed in its lower edge,
said panel pivoted to said back panel, below the pivot of said panel to said side walls, and
a pin extending through said side wall engageable with the bayonet type slots of said bracket.
3. An adjustable seat comprising,
a base including side walls at least one of which having an arculate slot,
a back panel pivoted to said side walls on an axis forming the center of the arcs defining said slot,
a seat panel,
a pivot pin passing through said slot and pivoting said back panel to said seat panel,
means on said base and seat panel respectively for selectively locking said seat panel in one of a plurality of longitudinal positions with respect to said base,
said locking means including engageable abutment means at the forward most position of said seat panel positively locking forward movement of said seat panel, and
said arcuate slot having one terminal location engageable by said pivot pin when said forward most abutment means are in engagement and said back panel is substantially horizontal.
4. An adjustable seat comprising,
a base including side walls at least one of which having an arcuate slot,
a back panel pivoted to said side walls on an axis forming the center of the arcs defining said slot,
a seat panel,
a pivot pin passing through said slot and pivoting said back panel to said seat panel, and
means on said base and seat panel respectively for selectively locking said seat panel in one of a plurality of longitudinal positions with respect to said base,
said arcuate slot having one terminal location engageable by said pivot pin when said back panel is substantially horizontal.
5. An adjustable seat for a movable vehicle comprising,
a base, including sheet metal sidewalls each having an arcuate slot,
a back panel having a sheet metal bracket on each side thereof and pivoted to said base, above said arcuate slot,
a seat panel having a sheet metal bracket on each side thereof,
a pivot pin passing through said slot and pivoting each said seat panel bracket to a respective back panel bracket,
cooperative means on said seat panel and base respectively for selectively locking said seat panel in one of a plurality of longitudinal positions, thereby effecting the selective positioning of said back panel in one of a plurality of angular positions with respect to said seat panel.
6. An adjustable seat comprising,
two sidewalls having arcuate slots extending upwardly and forwardly from the rear of said sidewalls,
a back panel pivoted to said sidewalls above said arcuate slots,
a seat panel,
means pivoting said seat panel to said back panel with said pivoting means extending through the arcuate slots, and
cooperative means on said seat panel and sidewalls for selectively fixing the longitudinal position of said seat panel with respect to said sidewalls thereby fixing the angular position of said back panel with respect to said sidewalls.

References Cited by the Examiner
UNITED STATES PATENTS

| | | | |
|---|---|---|---|
| 251,737 | 1/82 | Schmitz | 297—64 |
| 945,928 | 1/10 | Fowler et al. | 297—84 X |
| 1,673,257 | 6/28 | McKenna | 297—64 X |
| 1,918,261 | 7/33 | Gilch | 297—108 |
| 2,021,120 | 11/35 | Wilkins | 297—317 |
| 2,297,176 | 9/42 | Thompson | 297—64 |
| 2,351,222 | 6/44 | Muskin et al. | 297—317 X |
| 2,530,625 | 11/50 | Nordmark | 297—342 X |
| 2,576,343 | 11/51 | Hibbard et al. | 297—65 |
| 2,704,109 | 3/55 | Ripley | 297—64 X |
| 2,981,311 | 4/61 | Hacker | 297—65 |
| 3,074,759 | 1/63 | Bergenwall | 297—34.2 X |

FRANK B. SHERRY, *Primary Examiner.*